United States Patent
Sato et al.

(10) Patent No.: US 9,460,626 B2
(45) Date of Patent: Oct. 4, 2016

(54) DRIVING SUPPORT DEVICE AND DRIVING SUPPORT METHOD

(75) Inventors: Minami Sato, Susono (JP); Masayuki Shimizu, Susono (JP); Shoichi Hayasaka, Atsugi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/240,622

(22) PCT Filed: Aug. 26, 2011

(86) PCT No.: PCT/JP2011/069310
§ 371 (c)(1),
(2), (4) Date: Feb. 24, 2014

(87) PCT Pub. No.: WO2013/030903
PCT Pub. Date: Mar. 7, 2013

(65) Prior Publication Data
US 2014/0222326 A1  Aug. 7, 2014

(51) Int. Cl.
*G08G 1/16* (2006.01)
*B60W 10/18* (2012.01)
*B60K 31/00* (2006.01)

(52) U.S. Cl.
CPC .......... *G08G 1/166* (2013.01); *B60K 31/0008* (2013.01); *B60W 10/18* (2013.01)

(58) Field of Classification Search
CPC .. G08G 1/166; B60K 31/0008; B60W 10/18
USPC ........................................ 701/301
See application file for complete search history.

(56) References Cited

U.S. PATENT DOCUMENTS

2009/0326766 A1* 12/2009 Wang .............................. 701/46
2012/0035846 A1*  2/2012 Sakamoto et al. ............ 701/301

FOREIGN PATENT DOCUMENTS

| CN | 101383100 A |   | 3/2009  |            |
|----|-------------|---|---------|------------|
| CN | 101383100 A | * | 11/2009 | G08G 1/0965 |
| JP | 2004-302621 |   | 10/2004 |            |
| JP | 2005-352610 |   | 12/2005 |            |
| JP | 2006-146948 |   | 6/2006  |            |
| JP | 2006-301842 A |   | 11/2006 |            |
| JP | 2009-64333  |   | 3/2009  |            |
| JP | 2009-282702 A |   | 12/2009 |            |

(Continued)

OTHER PUBLICATIONS

Patent translation of cn101383100 A.*

(Continued)

*Primary Examiner* — Mussa A Shaawat
*Assistant Examiner* — Yazan Soofi
(74) *Attorney, Agent, or Firm* — Oblon, McClelland, Maier & Neustadt, L.L.P.

(57) ABSTRACT

A driving support device and a driving support method, which can appropriately determine whether driving support is necessary and perform effective driving support, are provided. A driving support device calculates TTC, which is a time required for the vehicle to arrive at an intersection point at which the vehicle and a moving object intersect in the traveling direction of the vehicle and in a direction intersecting with the traveling direction, and TTV required for the moving object to arrive at the intersection point, and performs driving support in the vehicle based on the relative relation between TTC and TTV.

5 Claims, 4 Drawing Sheets

(56) References Cited

FOREIGN PATENT DOCUMENTS

| JP | 2010-108343 | 5/2010 |
|----|-------------|--------|
| JP | 2010-257298 | 11/2010 |

OTHER PUBLICATIONS

International Search Report issued Dec. 6, 2011, in PCT/JP11/069310 filed Aug. 26, 2011.

\* cited by examiner

DRIVING SUPPORT DEVICE AND DRIVING SUPPORT METHOD

TECHNICAL FIELD

The present invention relates to a driving support device and a driving support method that provide driving support for avoiding collision between a vehicle and a moving object.

BACKGROUND ART

The driving support device described in Patent Literature 1 is known as a conventional driving support device. The driving support device described in Patent Literature 1 detects the position of an object present in the traveling direction of the vehicle and determines whether the horizontal moving speed of the detected object in the traveling direction is equal to or lower than a predetermined speed. If it is determined that the horizontal moving speed is equal to or lower than a predetermined speed, the driving support device determines whether the vehicle will contact the moving object based on the detection angle composed of the detection direction of the moving object and the traveling direction of the vehicle.

CITATION LIST

Patent Literature

Patent Literature 1: Japanese Patent Application Publication No. 2010-257298 (JP 2010-257298 A)

SUMMARY OF THE INVENTION

Problem to be Solved by the Invention

In a situation in which a pedestrian ahead of a vehicle is going to cross the road, the pedestrian may have finished crossing the road when a vehicle reaches the point at which the pedestrian is present, in which case there is no need to perform driving support for avoiding collision with the pedestrian. Even in such a case, if the horizontal moving speed is equal to or lower than a predetermined speed, the conventional driving support device may determine the possibility of contact based on the detection angle with the vehicle and perform driving support. Therefore, unnecessary driving support may be performed, in which case the driver may feel uncomfortable about the difference from the actual situation.

The present invention is intended to solve the problem described above, and it is an object of the present invention to provide a driving support device and a driving support method that can appropriately determine whether driving support is necessary and perform effective driving support.

Means for Solving the Problem

To solve the problem described above, a driving support device according to the present invention is a driving support device that performs driving support for avoiding collision between a vehicle and a moving object, the driving support device characterized in that a first time and a second time are calculated, the first time being a time required for the vehicle to arrive at an intersection point at which the vehicle and the moving object intersect in a traveling direction of the vehicle and in a direction intersecting with the traveling direction, the second time being a time required for the moving object to arrive at the intersection point and driving support is performed in the vehicle based on a relative relation between the first time and the second time.

This driving support device predicts the first time required for the vehicle to arrive at an intersection point in the traveling direction and the second time required for the moving object to arrive at the intersection point in the direction intersecting with the traveling direction, that is, in the direction lateral to the vehicle and performs driving support in the vehicle based on the relative relation between the predicted first time and second time. In this manner, by predicting the second time required for the moving object to arrive at the intersection point, driving support may be performed based on accurate determination on whether driving support is necessary. As a result, effective driving support may be performed.

The driving support device includes first time-prediction means for predicting the first time required for the vehicle to arrive at the intersection point in the traveling direction; second time-prediction means for predicting the second time required for the moving object to arrive at the intersection point in a direction intersecting with the traveling direction; driving support determination means for determining whether driving support is to be performed in the vehicle by applying the first and second times, predicted by the first and second time-prediction means, to a pre-set map; and driving support control means for controlling driving support in the vehicle if the driving support determination means determines that driving support is to be performed in the vehicle. By applying the first time and the second time to the pre-set map in this manner, whether driving support is necessary can be determined accurately.

The driving support device further includes travel state detection means for detecting a travel state of the vehicle; and moving object state detection means for detecting a state of the moving object wherein the first and second time-prediction means predict the first time and the second time respectively, based on a travel state of the vehicle detected by the travel state detection means and a state of the moving object detected by the moving object state detection means. This configuration allows the first time and the second time to be predicted more accurately.

A first area, for which driving support is determined unnecessary, and a second area, for which driving support is determined necessary, are set in the map, and the driving support determination means determines that driving support is to be performed in the vehicle if a point representing a relation between the first time and the second time is present in the second area. By using this map, whether driving support is necessary may be determined more accurately.

A plurality of driving support contents is set each in the second area according to urgency and the driving support control means determines control contents of driving support to be performed in the vehicle according to contents of driving support that are set in the second area of the map. This configuration allows driving support to be performed appropriately according to the relative relation between the vehicle and the moving object.

A driving support method according to the present invention is a driving support method for avoiding collision between a vehicle and a moving object, the driving support method characterized in that a first time and a second time are calculated, the first time being a time required for the vehicle to arrive at an intersection point at which the vehicle and the moving object intersect in a traveling direction of the vehicle and in a direction intersecting with the traveling direction, the second time being a time required for the moving object to arrive at the intersection point and driving support is performed in the vehicle based on a relative relation between the first time and the second time.

This driving support method predicts the first time required for the vehicle to arrive at an intersection point in the traveling direction and the second time required for the moving object to arrive at the intersection point in the direction intersecting with the traveling direction, that is, in the direction lateral to the vehicle and performs driving support in the vehicle based on the relative relation between the predicted first time and second time. In this manner, by predicting the second time required for the moving object to arrive at the intersection point, driving support may be performed based on accurate determination on whether driving support is necessary. As a result, effective driving support may be performed.

The driving support method includes a first time-prediction step for predicting the first time required for the vehicle to arrive at the intersection point in the traveling direction; a second time-prediction step for predicting the second time required for the moving object to arrive at the intersection point in a direction intersecting with the traveling direction; a driving support determination step for determining whether driving support is to be performed in the vehicle by applying the first and second times, predicted by the first and second time-prediction steps, to a pre-set map; and a driving support control step for controlling driving support in the vehicle if the driving support determination step determines that driving support is to be performed in the vehicle.

The driving support method further includes a travel state detection step for detecting a travel state of the vehicle; and a moving object state detection step for detecting a state of the moving object wherein the first and second time-prediction steps predict the first time and the second time respectively, based on a travel state of the vehicle detected by the travel state detection step and a state of the moving object detected by the moving object state detection step.

Effects of the Invention

According to the present invention, whether driving support is necessary is appropriately determined and driving support can be performed effectively.

MODES FOR CARRYING OUT THE INVENTION

A preferred exemplary embodiment of the present invention is described below in detail with reference to the attached drawings. In the description of the drawings, the same or equivalent elements are represented by the same reference numerals, and duplicate description is eliminated.

Figure 1:
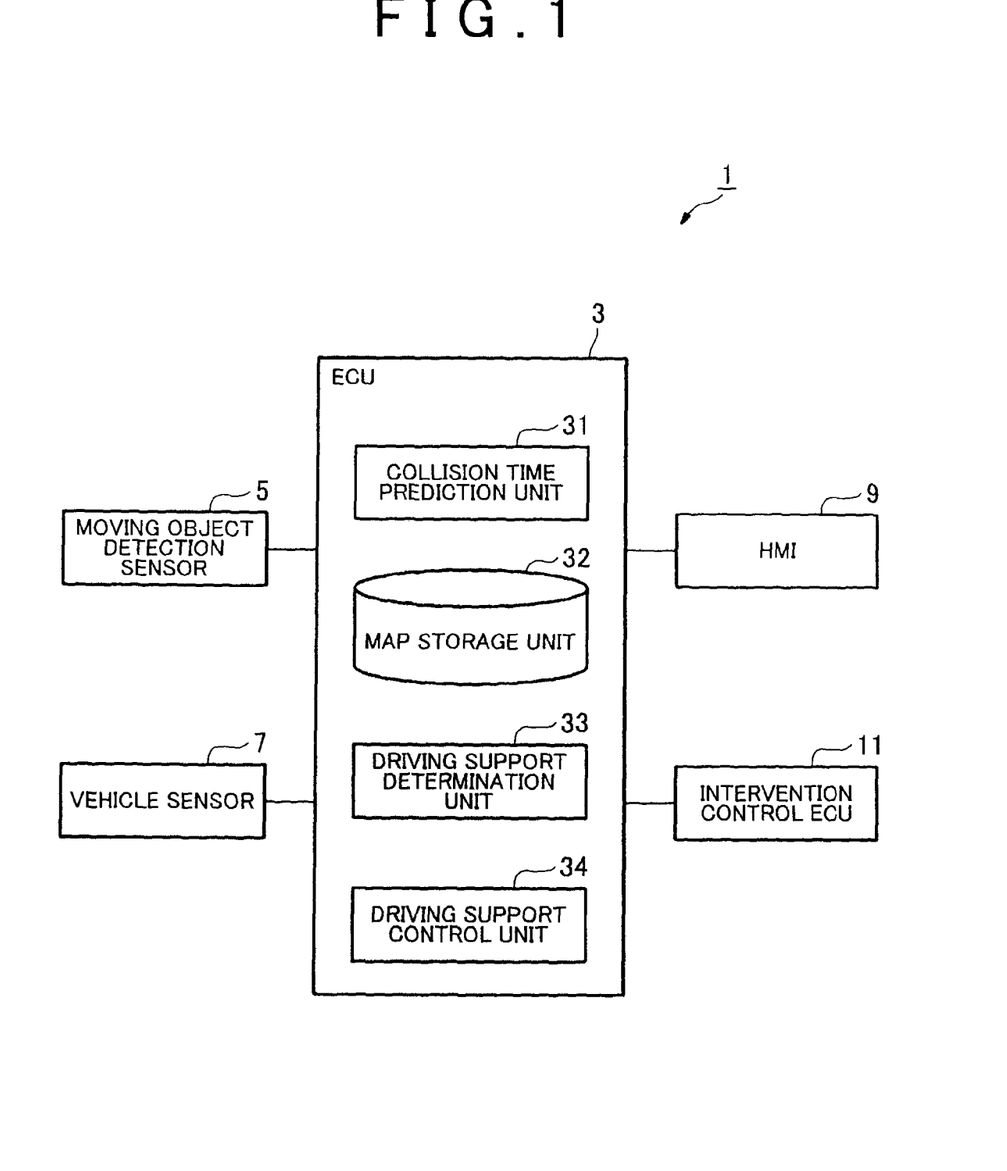
FIG. 1 is a diagram showing a driving support device in one exemplary embodiment.

FIG. 1 is a diagram showing the configuration of a driving support device in one exemplary embodiment. A driving support device 1 shown in FIG. 1 is a device that is installed in a vehicle, such as a car, to perform driving support for avoiding collision with a moving object such as a pedestrian or a bicycle. Driving support includes such processing as performing direct intervention control, such as braking and steering, for the vehicle and issuing a warning to the driver.

As shown in FIG. 1, the driving support device 1 includes an ECU (Electronic Control Unit) 3. A moving object detection sensor (moving object state detection means) 5, a vehicle sensor (traveling state detection means) 7, an HMI (Human Machine Interface) 9, and an intervention control ECU 11 are connected to the ECU 3. The ECU 3 and the intervention control ECU 11, each of which is an electronic control unit configured by a CPU [Central Processing Unit], a ROM [Read Only Memory], and a RAM [Random Access Memory], operate according to a program.

The moving object detection sensor 5 is an outside-world sensor that detects a moving object. The moving object detection sensor 5 is imaging means, for example, a laser radar, a millimeter wave radar, or a camera. When the moving object detection sensor 5 is a millimeter wave radar, it detects a moving object ahead of the vehicle by sending and receiving a frequency-modulated, millimeter-waveband radar wave and, based on the detection result, generates moving object information such as the position and the speed of the moving object. The moving object detection sensor 5 outputs moving object information to the ECU 3. When the moving object detection sensor 5 is a camera, it performs image processing for an imaged image and generates moving object information. The moving object detection sensor 5 may be configured by both a millimeter wave radar and a camera.

The vehicle sensor 7 is an inner-angle sensor that detects the traveling state of the vehicle. The vehicle sensor 7 is, for example, a yaw rate sensor that detects the yaw rate of the vehicle, a steering angle sensor that detects the steering angle of the steering, or a vehicle speed sensor that detects the vehicle speed (traveling speed) of the vehicle. The vehicle sensor 7 outputs vehicle information, which indicates the detected traveling state of the vehicle, to the ECU 3.

The ECU 3 includes a collision time prediction unit (first time-prediction means, second time-prediction means) 31, a map storage unit 33, a driving support determination unit (driving support determination means) 35, and a driving support control unit (driving support control means) 34.

The collision time prediction unit 31 is a part that predicts the time to the moment when the vehicle and a moving object arrive at the intersection point. When the moving object information, output from the moving object detection sensor 5, and the vehicle information, output from the vehicle sensor 7, are received, the collision time prediction unit 31 calculates the time of collision between the vehicle and the moving object, that is, the time to the moment when the vehicle and the moving object arrive at the intersection point at which the driver's vehicle and the moving object intersect, based on the moving object information and the vehicle information.

The collision time prediction unit 31 finds the predicted trajectory of the vehicle based on the vehicle information and calculates the time to the moment when the vehicle arrives the intersection point, that is, TTC (Time To Collision, first time) that is the value indicating in how many seconds the vehicle will collide with the moving object when vehicle continues traveling in the traveling direction in the current state. In addition, the collision time prediction unit 31 finds the speed vector of the moving object based on the moving object information and calculates the time to the moment when the moving object arrives at the intersection point, that is, TTV (Time To Vehicle, second time) that is the value indicating in how many seconds the moving object will collide with the vehicle when the moving object continues moving in the direction (direction lateral to the direction of vehicle), in which the moving object will intersect with the vehicle, in the current state.

The collision time prediction unit 31 calculates TTC and TTV using expression (1) and expression (2) given below.

$$TTC = x/(V-vx) \quad (1)$$

$$TTV = y/vy \quad (2)$$

In expressions (1) and (2) given above, V indicates the speed of the vehicle, x and y indicate the relative position of the moving object, and vx and vy indicate the speed of the moving object. The collision time prediction unit 31 outputs the TTC information and the TTV information, which indicate the calculated TTC and TTV respectively, to the driving support determination unit 35.

Figure 2:
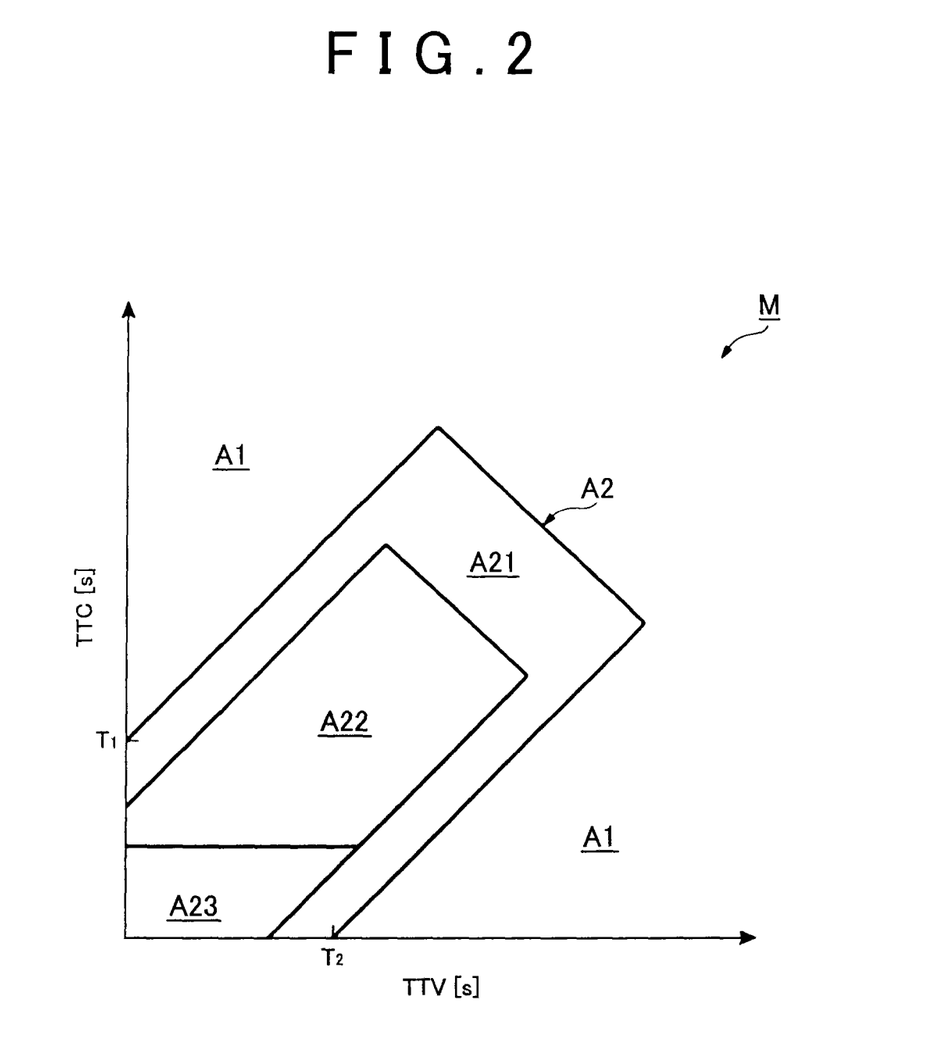
FIG. 2 is a diagram showing a map.

The map storage unit 33 stores the map M. FIG. 2 is a diagram showing a map. As shown in FIG. 2, with TTC [s] on the vertical axis and TTV [s] on the horizontal axis, the map M indicates the relative relation between TTC and TTV. In the map M, the origin is set to the intersection point between the vehicle and the moving object. In the map M, as a point is away from the origin (as TTC and TTV becomes large), the point indicates a location away from the intersection point. In the map M, two types of area are set: driving support unnecessary area (first area) A1 and driving support area (second area) A2. The map M is described more in detail below.

The driving support area A2 is an area surrounded by the function y=fx(TTC, TTV). The two straight lines defining the driving support area A2 are set by the difference (TTC−TTV) between TTC and TTV. In the map M, $T_1$ and $T_2$ are set, for example, to 1 to 3 seconds.

In the driving support area A2, a plurality of areas are set in advance according to the urgency of the control contents of driving support: an HMI area A21, an intervention control area A22, and an urgency intervention control area A23. The HMI area A21 is an area in which driving support, such as the issuance of a warning to the driver, is performed. The intervention control area A22 is set inside the HMI area A21. The intervention control area A22 is an area in which intervention control, such as braking is performed. The urgency intervention control area A23 is an area in which sudden braking is applied to perform urgency intervention control for avoiding collision. The urgency intervention control area A23 is set near to the origin of the map M, that is, to the part near to the intersection point between the vehicle and the moving object.

The driving support unnecessary area A1 is a part other than the driving support area A2 and is an area that does not require driving support for avoiding collision between the vehicle and the moving object. That is, when an area corresponds to the driving support unnecessary area A1, it means that the moving object will already passed through the intersection point when the vehicle arrives at the intersection point or that the moving object is far from the intersection point.

The map M may be map in which the driving support area A2 and driving support unnecessary area A1 are set based on experimental data or in which the driving support area A2 and the driving support unnecessary area A1 are set through learning about the driver's driving characteristics (accelerator characteristics, brake characteristics). In the map M, the control amount of driving support may be set for the intervention control area A22 and the urgency intervention control area A23. The map M memorized (stored) in the map storage unit 33 may be rewritten (update of map M).

Figure 3:
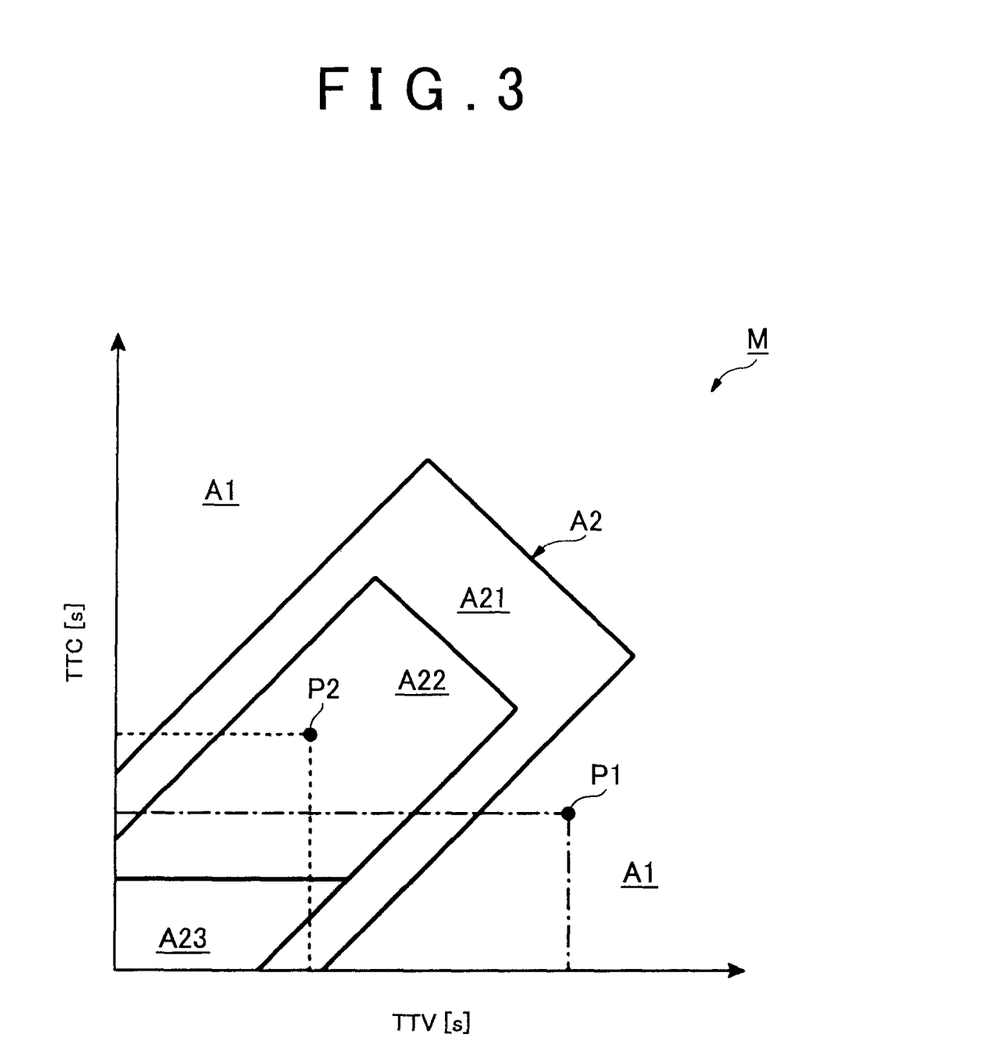
FIG. 3 is a diagram showing a determination method of a driving support determination unit for determining whether driving support is necessary.

The driving support determination unit 35 is a part that determines whether driving support is to be performed in the vehicle. The driving support determination unit 35 applies TTC and TTV to the map M to determine whether to perform driving support in the vehicle. More specifically, the driving support determination unit 35 applies the TTC information and the TTV information, output from the collision time prediction unit 31, to the map M to determine in which area in the map M the intersecting point between TTC and TTV (point indicating the relation between TTC and TTV) is located. For example, when TTC and TTV intersect at the point P1 as shown in FIG. 3, the driving support determination unit 35 determines not to perform driving support in the vehicle because the point P1 belongs to the driving support unnecessary area A1. That is, when TTC and TTV intersect at the point P1, the vehicle will have passed through the intersection point when the moving object arrives at the intersection point.

On the other hand, when TTC and TTV intersect at the point P2, the driving support determination unit 35 determines to perform driving support in the vehicle because the point P2 belongs to the driving support area A2 (intervention control area A22). If it is determined to perform driving support, the driving support determination unit 35 outputs support performing information, which includes information indicating at least one of the HMI area A21, intervention control area A22, and urgency intervention control area A23, to the driving support control unit 34.

Returning to FIG. 1, the driving support control unit 34 is a part that controls driving support in the vehicle. When the support performing information, output from the driving support determination unit 35, is received, the driving support control unit 34 controls driving support (intervention control) based on the support performing information. The intervention control is, for example, braking control or steering control. If the information on the HMI area A21 is included in the support performing information, the driving support control unit 34 outputs the warning instruction signal to the HMI 9.

If the information indicating the intervention control area A22 and the urgency intervention control area A23 is included in the support performing information, the driving support control unit 34 calculates the control amount of intervention control. If the control amount is set in the intervention control area A22 and the urgency intervention control area A23 in the map M, the driving support control unit 34 calculates the control amount of braking (target acceleration (deceleration acceleration), speed) based on the map M. If the control amount is not set in the map M, the driving support control unit 34 calculates the control amount based on the expression (3) given below.

$$\alpha \times TTC + \beta \times TTV + \gamma \quad (3)$$

where, $\alpha$ and $\beta$ are coefficients and $\gamma$ is a constant. $\alpha, \beta$, and $\gamma$ are set based on experiment values. The control amount of steering is calculated based on experiment values and a predetermined expression. The driving support control unit 34 outputs the intervention control signal, which includes the control amount, to the intervention control ECU 11.

The HMI 9 is, for example, a buzzer, an HUD (Head Up Display), the monitor of the navigation system, or a meter panel. When the warning instruction signal, output from the ECU 3, is received, the HMI 9 outputs a voice warning, or displays a warning message, to warn the driver that there is a moving object in the forward direction. For example, when the HMI 9 is an HUD, a popup indicating that there is a moving object is displayed on the front glass.

The intervention control ECU 11 is an ECU that performs intervention control in the vehicle. When the intervention control signal, output from the ECU 3, is received, the intervention control ECU 11, composed of the brake ECU and engine ECU (both not shown), controls the brake actuator and the steering actuator (both not shown) according to the control amount, included in the intervention control signal, to perform automatic intervention control.

Figure 4:
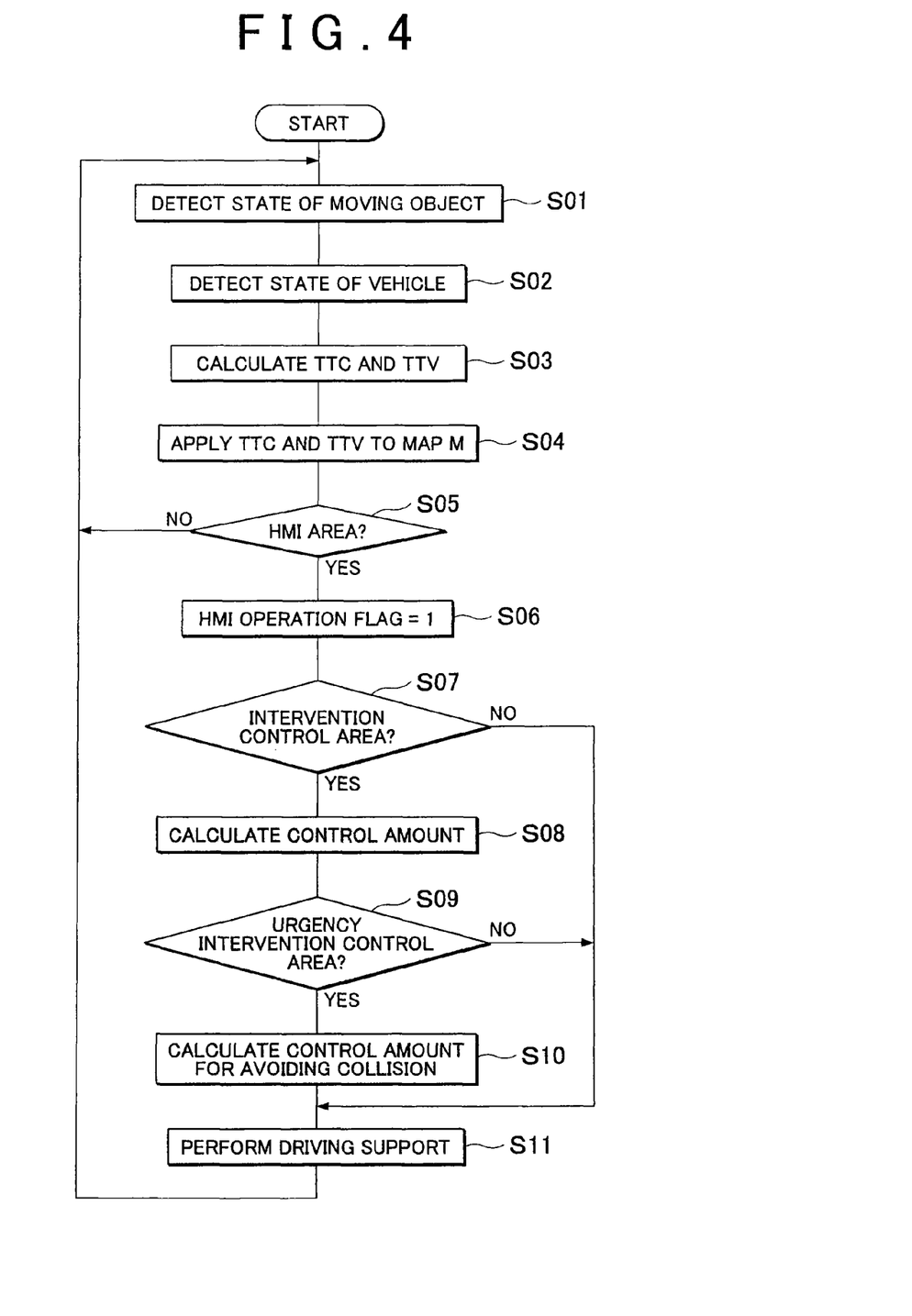
FIG. 4 is a flowchart showing the operation of the driving support device.

Next, the operation of the driving support device 1 is described below. FIG. 4 is a flowchart showing the operation of the driving support device.

As shown in FIG. 4, the moving object detection sensor 5 detects the state of an moving object (step S01), or the vehicle sensor 7 detects the traveling state of the vehicle (step S02). Next, the collision time prediction unit 31 calculates TTC and TTV based on the moving object information and the vehicle information detected by the moving object detection sensor 5 and the vehicle sensor 7 respectively (step S03).

Next, the driving support determination unit 35 applies the calculated TTC and TTV, calculated by the collision time prediction unit 31, to the map M stored in the map storage unit (step S04) and determines whether to perform driving support in the vehicle.

The driving support determination unit 35 determines whether the intersection between TTC and TTV belongs to the HMI area A21, that is, whether the intersection belongs to the driving support area A2 (step S05). If it is determined that the intersection belongs to the HMI area A21, the HMI operation flag is set to "1" (step S06). On the other hand, if it is not determined that the intersection belongs to the HMI area A21, that is, the intersection belongs to the driving support unnecessary area A1, the processing returns to step S01.

Next, the driving support control unit 34 determines whether the intersection belongs to the intervention control area A22 (step S07). If it is determined that the intersection belongs to intervention control area A22, the driving support control unit 34 calculates the control amount of intervention control, for example, based on the map M (step S08). On the other hand, if it is not determined that the intersection belongs to the intervention control area A22, the processing proceeds to step S11.

Next, the driving support control unit 34 determines whether the intersection belongs to the urgency intervention control area A23 (step S09). If it is determined that the intersection belongs the urgency intervention control area A23, the driving support control unit 34 calculates the control amount for avoiding emergency (step S10). On the other hand, if it is not determined that the intersection belongs to the urgency intervention control area A23, the processing proceeds to step S11.

In step S11, driving support is performed. More specifically, the HMI 9 warns the driver and, at the same time, the intervention control ECU 11 performs intervention control.

As described above, the collision time prediction unit 31 predicts TTC and TTV through calculation in this exemplary embodiment, and the driving support determination unit 35 applies the calculated TTC and TTV to the map M to determine whether to perform driving support in the vehicle. In this manner, whether driving support should be performed may be determined appropriately by predicting TTV that is the time for the moving object to arrive at the intersection point, that is, the collision time in the direction in which the moving object approaches the vehicle. As a result, this exemplary embodiment can avoid a situation, in which driving support is performed even after a moving object has crossed the roadway, allowing effective driving support to be performed without making the driver feel uncomfortable.

In the map M, the driving support unnecessary area A1 and the driving support area A2 are set and, in the driving support area A2, the HMI area A21, intervention control area A22, and urgency intervention control area A23 are set. The use of such a map M allows the necessity of driving support to be determined accurately and, at the same time, driving support to be performed properly according to the situation.

The present invention is not limited to the exemplary embodiment described above. For example, though the HMI 9 also issues a warning message in the exemplary embodiment described above when the intervention control ECU 11 performs intervention control, the HMI 9 may not issue a warning when intervention control is performed.

In addition to the exemplary embodiment described above, another configuration is also possible in which means for acquiring surrounding information (environment) on the vehicle is provided to perform driving support according to the situation of the surrounding area of the vehicle (for example, whether an oncoming car is present).

DESCRIPTION OF REFERENCE NUMERALS

1 . . . Driving support device, 3 . . . ECU, 5 . . . Moving object detection sensor, 7 . . . Vehicle sensor, 31 . . . Collision time prediction unit (first time-prediction unit, second time-prediction unit), 33 . . . Map storage unit, 35 . . . Driving support determination unit (driving support determination means), 34 . . . driving support control unit (driving support control means), M . . . Map

The invention claimed is:

1. A driving support device that performs driving support for avoiding collision between a vehicle and a moving object, the driving support device comprising:
   circuitry configured to:
      predict a first time required for the vehicle to arrive at an intersection point in a traveling direction, the intersection point being a point at which the vehicle and the moving object intersect in the traveling direction of the vehicle and in a direction intersecting with the traveling direction;
      predict a second time required for the moving object to arrive at the intersection point in the direction intersecting with the traveling direction;
      determine whether driving support is to be performed in the vehicle by applying the predicted first and second times to a pre-set map; and
      control driving support in the vehicle if driving support is determined to be performed in the vehicle,
   wherein a first area, for which driving support is determined unnecessary, and a second area, for which driving support is determined necessary, are set in the map, and
   wherein driving support is determined to be performed in the vehicle if an intersecting point between the first time and the second time is present in the second area, the intersecting point representing a relation between the first time and the second time.

2. The driving support device according to claim 1, wherein the circuitry is further configured to:

detect a travel state of the vehicle; and detect a state of the moving object, and wherein the first time and the second time are predicted, respectively, based on a travel state of the vehicle detected by the travel state detection portion and a state of the moving object detected by the moving object state detection portion.

3. The driving support device according to claim 1, wherein a plurality of driving support contents is set in the second area in advance according to urgency, and wherein the circuitry is further configured to determine control contents of driving support to be performed in the vehicle according to contents of driving support that are set in the second area of the map.

4. A driving support method for avoiding collision between a vehicle and a moving object, the driving support method comprising, predicting a first time required for the vehicle to arrive at an intersection point in a traveling direction, the intersection point being a point at which the vehicle and the moving object intersect in the traveling direction of the vehicle and in a direction intersecting with the traveling direction;

predicting a second time required for the moving object to arrive at the intersection point in the direction intersecting with the traveling direction;

determining whether driving support is to be performed in the vehicle by applying the first and second times to a pre-set map; and controlling driving support in the vehicle if performing the driving support in the vehicle is determined, wherein a first area, for which driving support is determined unnecessary, and a second area, for which driving support is determined necessary, are set in the map, and wherein driving support is determined to be performed in the vehicle if an intersecting point between the first time and the second time is present in the second area, the intersecting point representing a relation between the first time and the second time.

5. The driving support method according to claim 4, further comprising:

detecting a travel state of the vehicle; and detecting a state of the moving object wherein the first time and the second time are predicted respectively, based on the travel state of the vehicle and the state of the moving object.

* * * * *